Oct. 31, 1950 E. M. KNABUSCH ET AL 2,527,739
FABRIC CUTTING MACHINE
Filed May 4, 1945 5 Sheets-Sheet 1
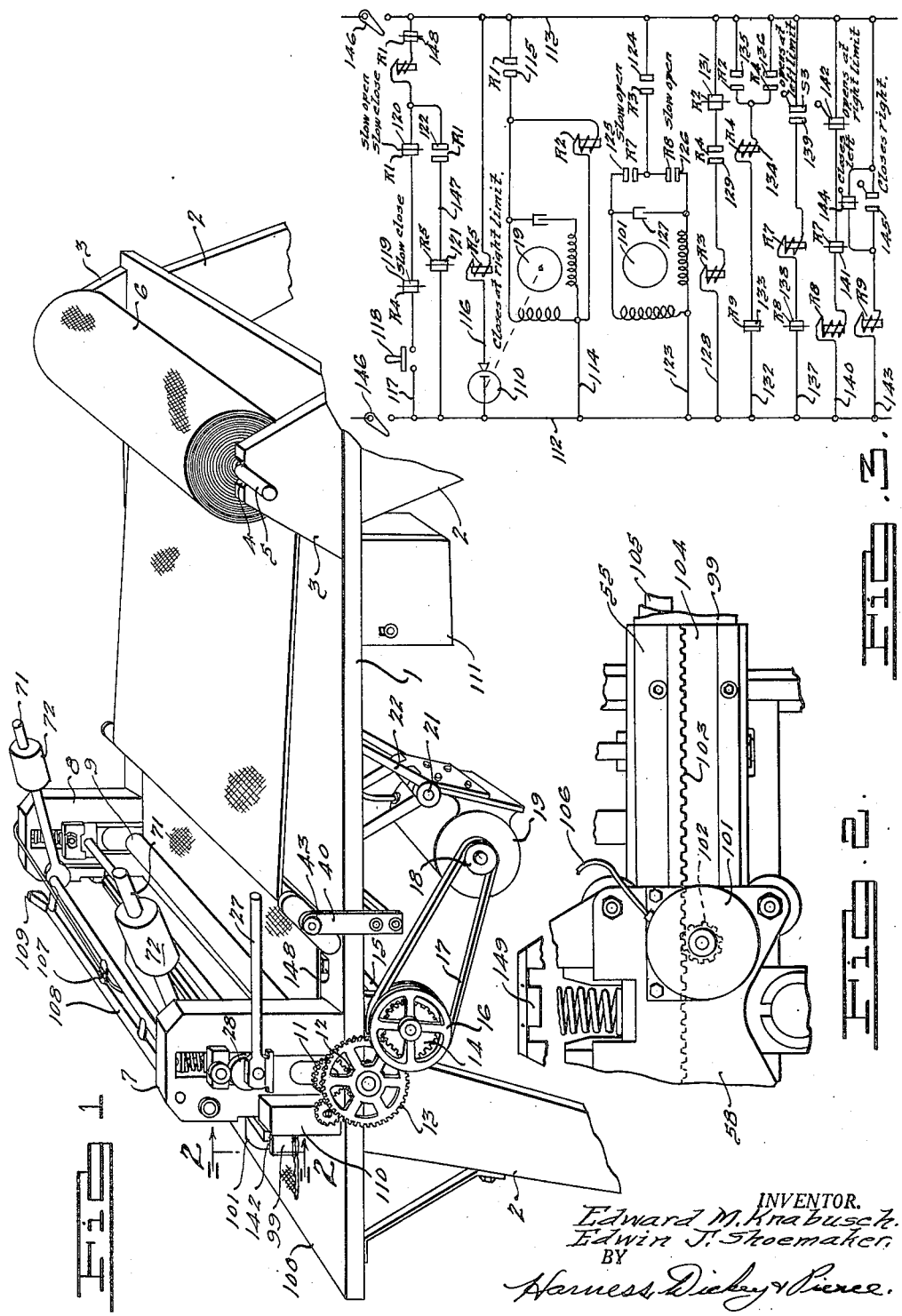
INVENTOR.
Edward M. Knabusch.
Edwin J. Shoemaker.
BY
Harness, Dickey & Pierce.
ATTORNEYS.

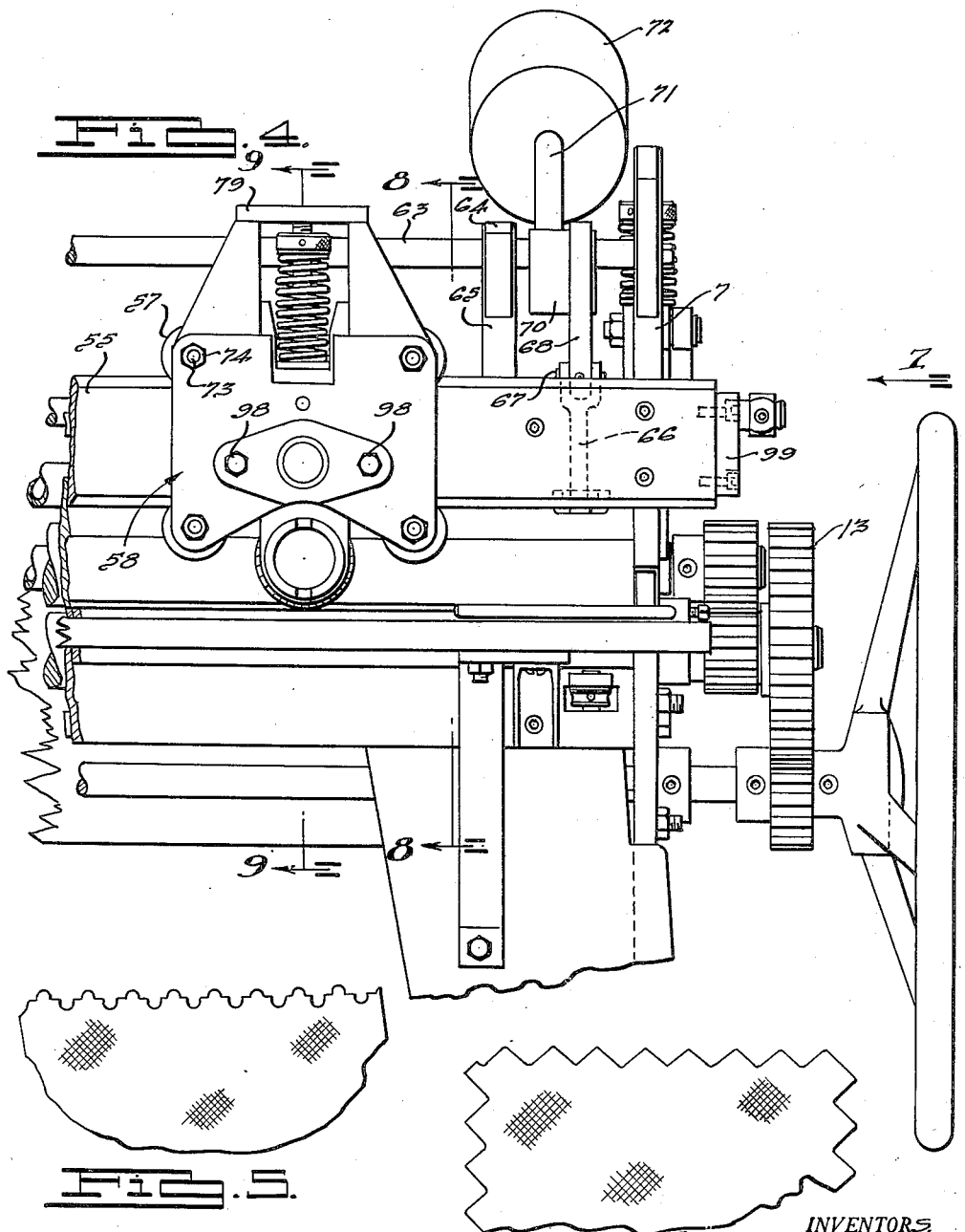

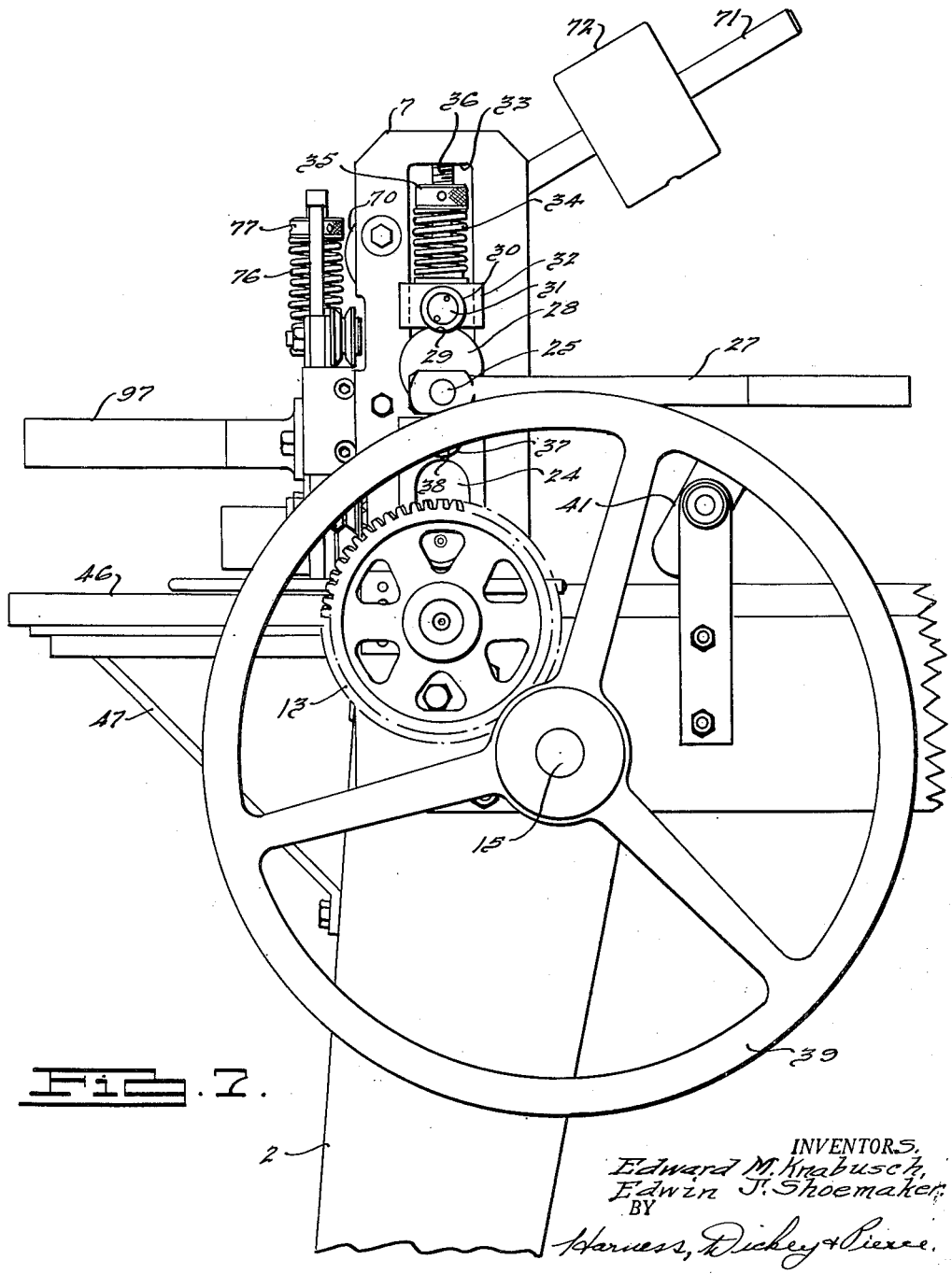

Oct. 31, 1950   E. M. KNABUSCH ET AL   2,527,739
FABRIC CUTTING MACHINE

Filed May 4, 1945                        5 Sheets-Sheet 4

INVENTORS
Edward M. Knabusch,
Edwin J. Shoemaker.
BY
Harness, Dickey & Pierce
ATTORNEYS.

Patented Oct. 31, 1950

2,527,739

UNITED STATES PATENT OFFICE 2,527,739

FABRIC CUTTING MACHINE

Edward M. Knabusch and Edwin J. Shoemaker, Monroe, Mich., assignors to La-Z-Boy Chair Company, Monroe, Mich., a corporation of Michigan Application May 4, 1945, Serial No. 592,002

6 Claims. (Cl. 164—76)

This invention relates to fabric cutting machines, and particularly to a machine for severing predetermined lengths of fabric while producing a straight-line, pinked, lace or other edge.

The machine of the present invention operates on various types of materials, such as woven or knitted fabrics, imitation and genuine leather, and in fact any material capable of being severed by a cutting roll. The machine is capable of cutting along a straight line to produce a straight-line edge to the fabric, or the cut may be sinuous to produce a pinked edge which is desirable to provide resistance to raveling and fraying. When a more decorative pattern is desired, the cut may take the form of a lace edge, the shape of which depends upon the shape provided to the cutting wheel employed to perform the cutting operation. The wheel is mounted upon a carriage to travel across a race upon which the material rests. The race is mounted upon a bed portion of the machine which supports uprights having feed rolls thereon which control the amount of material fed over the race and the width of the cut sections. The bed of the machine is supported upon a table near one end thereof, while at the opposite end supporting means are provided for the roll of material to be cut. The material is initially fed over and under a pair of stationary bars to maintain the cloth taut and free of wrinkles when being fed by the rolls. A hold-down bar is disposed adjacent to the race to prevent the slippage of the material or its piling up ahead of the cutting wheel as it is advanced along the race to produce the cutting operation. After the material has been cut to predetermined widths, it is within the purview of the invention to again feed the material through the device to cut the strips into swatches to provide small pieces, such as those employed in samples and the like.

The machine may be hand operated or may be made fully automatic by employing a motor to rotate the rolls and a second motor to drive the carriage containing the cutting roll from one to the other side of the bed after each feeding operation. Means are provided at the ends of the race for automatically raising the hold-down bar and for reversing the motor so that after the next feeding operation the cutting head will be returned to the opposite side of the bed where the motor will be reversed and the hold-down bar raised. The rolls are maintained in intimate relation to each other by springs which supply gripping pressure to the fabrics and are separated by the operation of eccentric cams operated by a lever. After the rolls have been separated, the end of the new roll of fabric may be fed through the smoothing and tensioning device and placed between the rolls in position to be fed. The lever is then returned to its original position to permit the springs to apply a predetermined force between the rolls for maintaining a gripping pressure on the fabric positioned therebetween. Control means may be provided on the rolls or operated by the gears producing their movement in rotation for actuating switch means for interrupting the operation of the motor to thereby control the amount of fabric advanced across the race during each feeding operation. Upon interrupting the operation of the motor which drives the rolls, the circuit is completed to the motor which drives the cutting head which then traverses the race from one to the other side of the machine to sever the measured length of fabric from the roll. The cutting head operates a switch to reverse its motor so that it will return to the opposite side of the machine after the next feeding operation.

Accordingly, the main objects of this invention are: to provide a machine for severing lengths of fabrics as the fabric is automatically fed to the cutting head thereof; to provide a machine having a race and a carriage on which a cutting wheel is mounted for cutting strips of fabric to have a straight or sinuous edge to produce a straight, pinked or lace edge; to provide a machine having a pair of standards supporting rolls for feeding a predetermined length of fabric having means for separating the rolls for initially starting the fabric therethrough and which are urged toward each other to grip the fabric under a predetermined pressure for producing a positive feed thereto; to provide automatic means for feeding the fabric to the cutting wheel and for severing a length of the fabric by the passage of the wheel in one direction and, after feeding a new length of fabric, severing the fabric through the passage of the wheel to the opposite side of the machine and continuing the operation until all of the fabric has been severed; and in general to provide a machine for cutting lengths of fabrics from a roll, said machine being simple in construction, positive in operation, and economical of manufacture.

Other objects and features of novelty of the invention will be specifically pointed out or will become apparent when referring, for a better understanding of the invention, to the following description taken in conjunction with the accompanying drawings, wherein:

Figure 1 is a perspective view of a fabric cutting machine embodying features of this invention;

Fig. 2 is a broken sectional view of the structure illustrated in Fig. 1, taken on the line 2—2 thereof;

Fig. 3 is a wiring diagram of a control system employed to operate the device of Figs. 1 and 2 automatically;

Fig. 4 is a broken end view of structure, similar to that illustrated in Fig. 1, showing the feed roll manually operated;

Fig. 5 is a broken view of a piece of fabric having a lace edge cut by the cutting wheel of the device illustrated in Fig. 1;

Fig. 6 is a view of a piece of fabric having a pinked edge cut by the cutting wheel of the device illustrated in Fig. 1;

Fig. 7 is a side view of the structure illustrated in Fig. 4;

Figure 8:
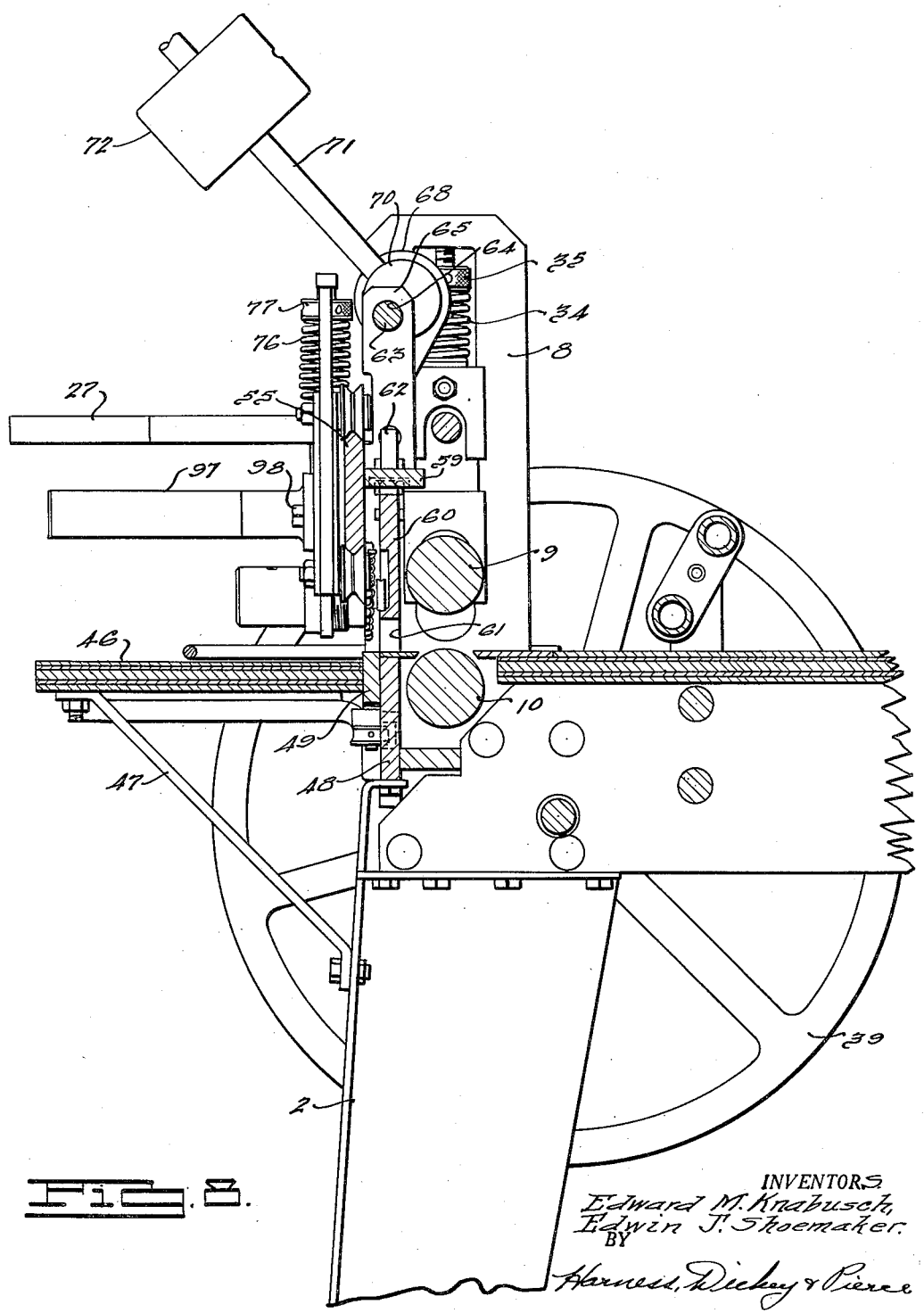
Fig. 8 is a sectional view of the structure illustrated in Fig. 4, taken on the line 8—8 thereof.

Referring to the figures, a table 1 is illustrated mounted upon legs 2 and supporting uprights 3 at one end which have notches 4 at the top for receiving the ends of a rod 5 on which the roll of fabric 6 to be cut into lengths is supported. It is to be understood that it is within the purview of the invention to employ a plurality of rolls mounted as a cradle for supporting the fabric if it is not convenient to employ the rod 5 through the center of the roll. A pair of like standards 7 and 8 is mounted at the opposite end of the table 1 from the uprights 3 on which a pair of rolls 9 and 10 is supported and provided with means by which they are separated to permit the fabric to be initially inserted therebetween.

A pair of spur gears 11 and 12 having like characteristics is mounted on one end of the rolls so that both rolls are driven when the lower roll is operated from a spur gear 13. The spur gear is driven from a spur gear 14 mounted on a shaft 15 suitably supported on the table 1 and driven by a pulley 16 and a belt 17. The belt is mounted over a pulley 18 on a motor 19 which is supported by a pivot 21 on a bracket 22 attached to the under side of the table. The length of the belt 17 is such that the weight of the motor 19 applies a tension thereto at all times to prevent slippage.

Stub shafts 23 on the end of the top roll 9 are suitably journaled in vertical slidable bearing elements 24 in the standards 7 and 8 through which a shaft 25 extends. Guide elements 26 are mounted in each of the standards 7 and 8 for guiding the bearing elements 24 for vertical movement. The guide elements have a slot 20 to provide clearance for the vertical movement of the stub shafts 23. The shaft 25 has secured thereto a pair of circular plates 28 mounted in eccentric relation on the shaft, as clearly illustrated in Fig. 7. An operating lever 27 is mounted on the shaft 25 which, when turned through 180° counterclockwise, as viewed in Fig. 7, moves the shaft 25 to its uppermost position, thereby raising the bearing elements 24 and the roll 9. The roll 9 is guided by the elements 26 in a vertical direction as the shaft 25 traverses a semicircular path. A notch 29 in the circular plate 28 engages a roller 30 which is rotatably mounted on a spanner head bolt 31 attached to a slidable plate 32 which is retained within slots 33 in the standards 7 and 8. A spring 34 is mounted on the upper end of the slidable plate 32, the tension of which is adjusted by a spanner nut 35 threaded on a stud 36 which projects into the slot 33.

A second roller 37 is mounted below the shaft 25 in position to engage the notch 29 of the circular plate 28 when the roll 9 is in its uppermost position for requiring a positive movement to the lever 27 for moving the roll 9 from either of its positions. The rollers 37 are mounted on the guide elements 26 by a stub rivet 38 in position to engage the circular plate 28 which is disposed between the two rollers 30 and 37.

The tension of the springs 34 acts through the slidable plates 32, the rollers 30, the circular plates 28 and the shaft 25 to apply a predetermined pressure upon the bearing elements 24 and the roll 9. When the circular plates 28 are so mounted, the springs 34 are additionally tensioned only a slight amount when the plate 28 is rotated to permit the notch 29 to move from contact with the roller 30 toward a position of engagement with the roller 37. The upward movement of the shaft 25 and the roller 9 does not otherwise change the tension on the springs 34.

The feed rolls 9 and 10 may be made of any suitable material for gripping and feeding the fabric and may be constructed of rubber, resinous or fabric material, or may be made of metal suitably knurled or otherwise machined so as to provide gripping faces to be capable of gripping and feeding all kinds of fabrics and other materials which may be cut into predetermined lengths in the device. Such fabrics may be cloth, leather, artificial leather, cellophane, resinous and like materials.

In Sheets 2, 3, 4 and 5 of the drawing a hand wheel 39 is illustrated as being mounted on the shaft 15 in place of the pulley 16 for manual operation. When a manually-operated machine is provided, it is desirable that a ratio be set up between the rotation of the hand wheel 39 and the amount of cloth fed through the rolls. In the structure illustrated, one turn of the hand wheel feeds three inches of the material through the rolls. Any length of feed, therefore, may be accurately indicated through the number of turns or fractions thereof of the hand wheel 39. Devices, known in the art to be suitable, may be employed for interrupting the rotation of the hand wheel 39 at any set number of turns and fractions thereof so that the machine can be set up to feed predetermined lengths of the fabrics through the rolls each time the wheel is operated until the stop element is reached. In other words, if a length of 22½" is desired to be severed from the roll of fabrics, seven and one-half turns of the hand wheel would feed this amount of fabric therethrough. It is to be understood that any devices now employed in the art for gaging the length of material fed through rolls could also be employed for this purpose.

Uprights 40 are mounted on opposite sides of the table 1 for pivotally supporting plates 41 which are interconnected at the ends by spaced tubular elements 42. The fabric of the roll is fed over the top tubular element 42 and under the bottom tubular element 42, as illustrated in Fig. 1, after which the plates 41 are angularly adjusted on the uprights 40 for providing a sufficient drag to the fabric being fed by the rolls 9 for the purpose of maintaining the fabric taut while smoothing out the wrinkles therein. A knurled screw 43 locks the plates 41 in adjusted position on the uprights 40. The plates 41 are so adjusted as to hold the fabric as close to the table as possible on the infeed side of the machine and to provide a sufficient drag to the fabric to smooth out all of the wrinkles which may be present therein.

The table 1 terminates short of the lower roll 10 and supports an overhanging plate 44 having its edge disposed adjacent to the contact line between the rolls 9 and 10 and tangent thereto. A similar extending plate 45 is mounted on the opposite side of the rolls in the plane of the plate 44. The plate 44 accurately guides the fabric between the rolls onto the plate 45, over which it is advanced over a measuring table 46 mounted in extension of the table 1 and reinforced by brackets 47 which are attached to the legs 2 adjacent thereto. The plate 45 is mounted on a bed 48 on the legs 2 positioned directly thereunderneath.

A hardened steel race 49 is mounted on the bed 48 by cap screws 50 which extend through slots 51 provided therein. A block 52, having a stud thereon, is mounted on the bed 48 for supporting a stud 53 which may be adjusted to accurately locate the height of the race 49, after which the stud 53 is locked in position by a spanner nut 54. The cap nuts 50 are thereafter tightened to clamp the race on the bed 48.

The uprights 7 and 8 support a track element 55 having V-shaped top and bottom edges 56 with which a plurality of V-shaped rollers 57 on a cutting head 58 engage for guiding the head as it is moved from one to the other side of the machine above the race 49. The track element 55 may be reinforced by a stiffening plate 59 which is welded or otherwise secured thereacross.

It is intended that after a predetermined amount of cloth has been fed through the rolls 9 and 10 that this be secured in position along its entire length adjacent to the race 49. For this purpose, a hold-down bar 60 is mounted in aligned relation with the bed 48 in position to engage and maintain the fabric against the plate 45. The inner faces of the standards 7 and 8 are provided with slots 61 in which the ends of the hold-down bar 60 are mounted for vertical movement. The hold-down bar 60 is provided with a plurality of guide pins 62 which extend through apertures in the stiffening element 59 which is secured to the track element 55. The guide pins 62 aid in guiding and stiffening the hold-down bar 60 relative to the slot 61 in which the ends of the bar operate.

A shaft 63 is journaled in the standards 7 and 8 and is journaled in bearing apertures 64 in uprights 65 which are attached to the stiffening bar 59. The hold-down bar 60 has a clevis bolt 66 near each of its ends, mounted by pins 67 in pivotal relation on the end of connecting links 68 having a circular opening 69 engaging a cylindrical block 70 which is secured to the shaft in off-center relation therewith, thus functioning as eccentrics for raising and lowering the links 68 and the hold-down bar 60. Rods 71 extend from the cylindrical block 70 and are preferably counterweighted by adjustable weights 72 for applying a predetermined force to the bar 60. When the rods 71 are moved in counterclockwise direction, the cylindrical block functions as an accentric, raises the link 68, the clevis bolt 66 and the hold- down bar 60 out of engagement with the fabric resting on the plate 45. Thereafter the fabric is fed by the rolls 9 and 10 onto the measuring table 46, after which the rods 71 are operated in a clockwise direction to lower the bar onto the fabric to securely clamp the fabric against the plate 45. The force applied is adjusted by the movement of the weights 72 on the rods 71. It is to be understood that when the hold-down bar 60 is in raised position, the rods have passed over a vertical position so that the weights 72 thereon tend to hold the bar in raised position. By turning the nuts on the clevis bolts 66, the bar 60 is adjusted to be in accurate aligned relation with the plate 45. Manual operation of the hold-down bar is eliminated in a manner which will be herein described, when the machine is automatically operated.

The cutting head, when mounted on the wheels 57, forms a carriage which is movable from one to the other side of the machine on the track element 55. The wheels 57 are secured to the carriage by shoulder bolts 73 and nuts 74. The bolts 73 on the top of the carriage are preferably eccentric so that they may be adjusted in rotation to compensate for any wear which may occur to the wheels or track element 55. A quill bar 75 is mounted for vertical movement in the carriage, being urged downwardly by a spring 76. The pressure on the spring 76 is regulated through the adjustment of the spanner nut 77 on the screw 78 which abuts against a bridge plate 79 on the carriage. Apertures 80 and 81 are provided, respectively, in the quill bar 75 and the cutting head 58 through which a pin is inserted to lock the quill bar in raised position against the tension of the spring 76 when cutting wheels are to be changed on the quill 82 supported on the end of the quill bar 75.

The quill 82 embodies a housing 83 having an exteriorly threaded portion which is screwed into a thread in an aperture 84 in the quill bar by a spanner nut 85 on the housing. A pair of bearings 86 is supported within the housing 83 for supporting a quill shaft 87 for rotation. A shouldered sleeve 88 near the end of the quill shaft 87 has a cutting wheel 89 forced into secured frictional relation therewith by a nut 90. The cutting wheel 89 is aligned with the hardened race 49 over which it rolls in contact with the fabric extending across the race when the cutting head 58 is moved from one to the other side of the machine.

The bearings 86 are held in secured position by a sleeve 91 disposed therebetween and clamped in position by a spanner nut 92 which provides end thrust for the quill shaft 87 and the cutting wheel 89 mounted thereon. An aperture 93 is provided through the housing 83 and sleeve 91 for the insertion of a pin into an aperture 94 extending through the quill shaft 87 for the purpose of locking the shaft against rotation when the nut 90 is to be removed to change cutting wheels 89. A slot 95 is provided in the face of the hold-down bar 60 into which the nut 90 on the end of the quill shaft 87 extends for the purpose of having the lower lip 96 of the hold-down bar engage the under side of the nut for raising the cutting wheel 90 along therewith out of engagement with the race 49 when a new roll of fabric is to be fed into the machine. Normally there is sufficient clearance below the nut 90 to permit the hold-down bar 60 to be raised without raising the quill or cutting wheel when it is disposed at the side of the machine so that it will not interfere with the feeding of the fabric. However, when the wheel is to be changed, the raising of the hold-down bar to a maximum amount will raise the quill rod 75 to align its aperture 80 with the aperture 81 in the cutting head body so that it may be locked in raised position by a pin during the time a cutting wheel is being changed.

Stop blocks 99 are secured to each end of the track element 55 to prevent the carriage 58 from overrunning either end thereof. It is within the purview of the invention to utilize a plurality of graduations (not shown) on top 100 of the measuring table, starting from the line of cut on the race 49, to facilitate the setting up of the machine when a new length of fabric is to be cut or to enable the operator to cut small quantities of material by directly measuring from the graduations.

Figure 9:
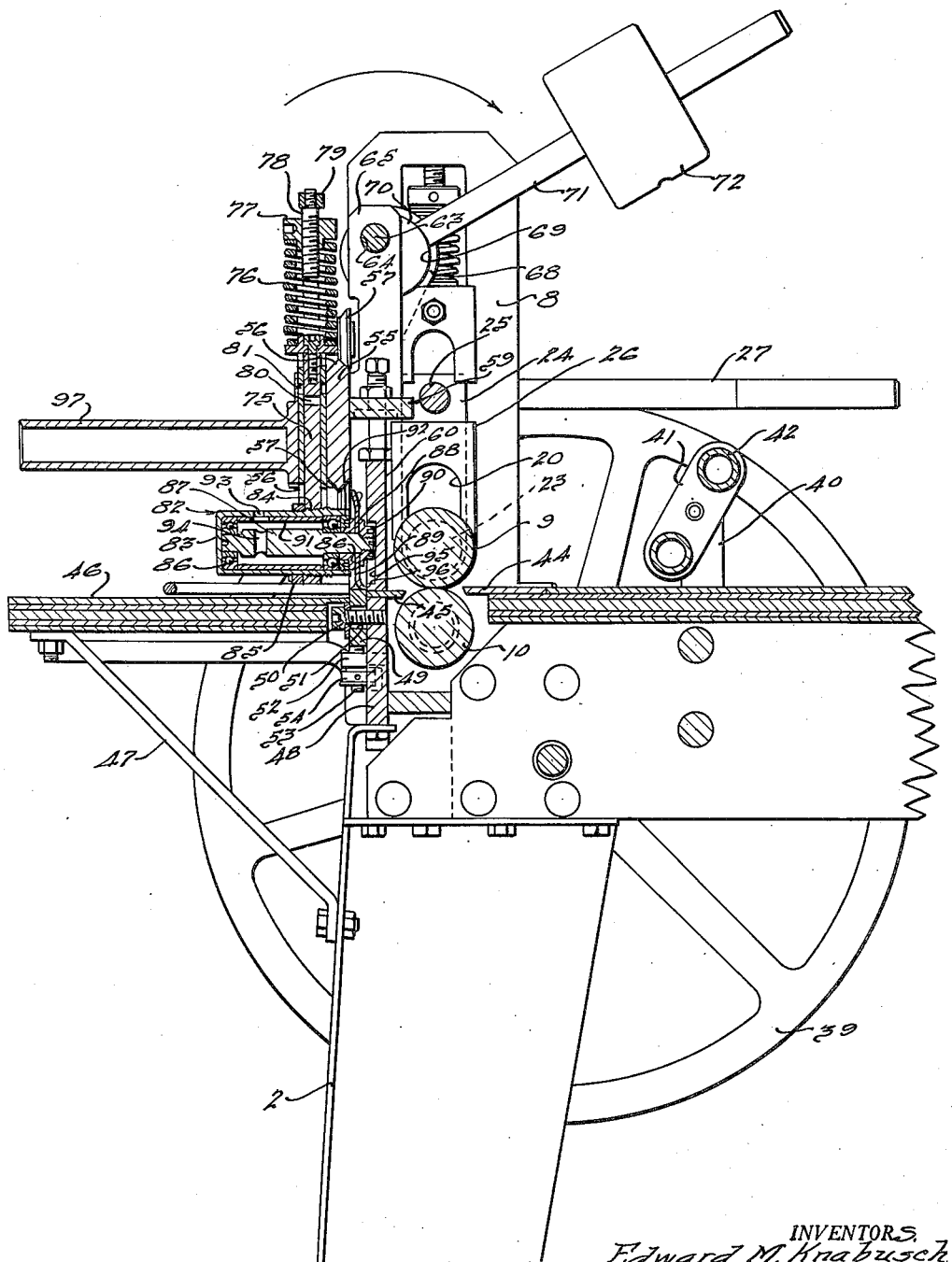
Fig. 9 is a sectional view of the structure illustrated in Fig. 4, taken on the line 9—9 thereof.

When the cutting head is to be manually operated, a tubular handle 97 is mounted on the body by nuts 98, as illustrated in Figs. 4, 7, 8 and 9. In the operation of a manually operated machine, the lever 27 and rod 71 are moved in a counterclockwise direction to raise the roll 9 and the hold-down bar 60, after which the fabric is fed over and under the tubes 42 of the tensioning device and between the rolls 9 and 10, after which the lever 27 is rotated in a clockwise direction to its original position, that illustrated in Fig. 7, to have the roll 9 clamp the fabric against the roll 10 under a predetermined spring pressure. Thereafter, the manually operated wheel 39 is rotated a predetermined amount to feed a predetermined length of the fabric onto the measuring table 46. After the wheel has been stopped at an indicated point, the rod 71 is moved in a clockwise direction to its original position at which the weight 72 thereof applies a predetermined pressure for clamping the fabric against the plate 45. Thereafter the handle 97 is grasped and the carriage 58 is moved to the opposite side of the machine during which movement the cutting wheel 89 traverses the fabric on the race 49 for severing the length of material from the roll. As pointed out hereinabove, the cut can be a straight line, a sinuous line to produce a pinked or lace edge, depending upon the shape of the peripheral cutting portion of the wheel.

For automatic operation the pulley 16 is substituted for the wheel 39 so as to have the rolls 9 and 10 driven by the motor 19. In this construction a second motor 101 is mounted on the carriage 58, as illustrated in Fig. 2, having a spur gear 102 in engagement with the teeth of the rack 103 mounted in a groove 104 in the track element 55. A limit switch 105 is mounted on the stop plates 99 at each side of the machine to be operated by the cutting head 58 when reaching the extremity of its travel toward one or the other edge of the table 1. The contacts of the limit switch 105 on the left-hand side of the machine, as viewed in the figures, are designated by numeral 139 in the wiring diagram of Fig. 3, while the contacts on the limit switch 105 at the right-hand side of the machine are designated by numeral 142. A conductor 106 is connected to the motor 101 and to the clevis 107 at the center of the machine with sufficient free length to permit the motor to travel to one or the other end of the track element 55. The shaft 63, which is operated in rotation by the manipulation of one or the other of the operating rods 71, has a bar 108 extending parallel thereto and provided with a cam surface 109 at each end engageable by a projecting boss 149 on the cutting head 58 for the purpose of moving the rod 108 downwardly, thereby operating the rod 71 and shaft 63 in a counterclockwise direction for raising the hold-down bar 60 from engagement with the fabric when the cutting head is at each end of the track element 55.

A suitable contact drum 110 is driven from the spur gear 13 and is of such construction that different drums and gear systems may be substituted so that various lengths of fabric may be measured by the engagement of the contacts of the device 110 as the motor 19 is driven. A suitable panel board is contained within a control box 111 on which relays are mounted and interconnected for procuring the sequential operation of the motor 19 and the carriage 58 from one to the other side of the device. The relay panel board is not shown since the wiring diagram will provide anyone skilled in the art with sufficient information to reproduce a like structure.

Referring to Fig. 3, the wiring diagram embodies a system of contacts, relays and switches for operating the machine automatically. This entails the feeding of the cloth by the rolls onto the measuring table, the securing of the cloth by the hold-down bar, and the movement of the cutting head 58 to the opposite side of the machine. Thereafter, the hold-down bar is released, the feed roll is again operated to feed a new length of cloth onto the measuring table, after which the hold-down bar again moves down to grip the cloth, and the cutting head is returned to the opposite side of the table. This operation will continue until a master switch is operated to interrupt the control system. Conductors 112 and 113 are interconnected by a circuit 114 through the motor 19 and contacts 115 of relay R1.

A relay R2 is disposed in parallel with the motor 19 and in series with the contacts 115 of relay R1. The control drum 110 of the feed mechanism is connected by a circuit 116 across the conductors 112 and 113 through a relay R5. A pilot circuit 117 is connected across the conductors 112 and 113 having a pilot switch 118 connected in series with delayed-operating contacts 119 of relay R4 and the delayed closing and opening contacts 120 of relay R1, all of which is in series with the relay coil R1. The switch 118 and contacts 119 and 120 are disposed in parallel with contacts 121 of the relay R5 and the contacts 122 of relay R1.

The motor 101 of the cutting head 58 is connected by a circuit 123 to the conductors 112 and 113 in series with contacts 124 of a relay R3. Contacts 125 of relay R7 and the contacts 126 of relay R8, both of which are of the delay-opening type, are disposed across the condenser 127 to control the flow of current to the field of the motor to produce the operation of the motor in one or the other direction of rotation. A circuit 128, connected across the conductors 112 and 113, contains relay R3, contacts 129 of relay R4, and contacts 131 of relay R2. A circuit 132, connected across the conductors 112 and 113, contains pawl-operated contacts 133 of relay R9, the coil 134 of contact R4, and the contacts 135 of relay R2 and 136 of relay R4 which are connected in parallel with each other. A circuit 137 interconnects the conductors 112 and 113 through contacts 138 of relay R8, the coil of relay R7 and the limit switch 139 disposed at the left-hand side of the table mounted on the stop block 99 and operated by the cutting head 58 at the end of its travel to the left side of the machine. A circuit 140 connected across the conductors 112 and 113 contains the coil of the relay R8, contacts 141 of relay R7, and a limit switch 142 mounted on the right-hand stop block 99 of the machine in position to be operated by the cutting head 58 upon its limit of travel to the right-hand side of the machine. A circuit 143 connected across the conductors 112 and 113 contains the coil of the relay R9 and the contacts 144 and 145 of the limit switches 139 and 142 respectively. The contacts 144 and 145 are disposed in parallel relation to each other in the circuit 143. The contacts of the limit switch 139 in the circuit 137 are open at the left limit of the cutting head 58, while the contacts 144 are closed. The contacts of the limit switch 142 are opened at the right limit of the cutting head 58, while the contacts 145 are closed. The relays R5 and R9 have contacts which are normally closed and are opened only for a short interval and immediately closed when the relays are actuated. These relays are usually actuated by a cam the shape of which regulates the interval that the contacts are separated each time the relays are actuated. The relays are not illustrated in detail since they are known to anyone skilled in the art of control systems. A switch 146 is disposed in the main circuit embodying the conductors 112 and 113 for the purpose of interrupting the system at any time and for de-energizing all of the circuits when the machine is not operating.

When the switch 146 is moved to closed position, the conductors 112 and 113 are energized so that when the pilot switch 118 is closed the coil of the relay R1 is energized to close the contacts 115 in the circuit 114 which energizes the motor 19 and causes it to rotate to open the contacts in the control drum 110. The contacts 122 of the relay R1 in the circuit 147 are also closed upon the operation of the pilot switch 118, completing a circuit thereacross so that when the pilot switch is released, when a single operation is desired, current will still flow in the pilot circuit, maintaining the relay R1 energized. The contacts 120 of the relay R1 in the circuit 117 are of the delayed-opening type so as to open after the contacts 122 have closed, thereby shunting a circuit across the pilot switch 118 which will no longer control the circuit 117. The circuit through the relay R1 is maintained through the circuit 147.

The motor 19 will continue to operate until the contacts of the drum 110 are again completed, at which time the relay R5 will be energized to momentarily open the contacts 121, thereby de-energizing the relay R1 and opening the contacts 115 to thereby interrupt the motor 19. While the motor 19 was operating, the relay coil R2 was energized to open the contacts 131 of the circuit 128 and to close the contacts 135 of circuit 132. This energizes the coil R4 to close the contacts 129 of the circuit 128, which circuit is completed upon the interruption of the contacts 115 to de-energize the relay coil of relay R2, thereby closing the contacts 131 of the circuit. The energization of the coil of the relay R3 closes contacts 124 of the circuit 123 thereby energizing the field of the motor 101 to cause it to rotate. Contacts 135 of circuit 132 were opened by the de-energization of the coil of the relay R2 and the circuit is maintained completed by contacts 136 of relay R4.

The motor 101 will operate to drive the cutting head 58 to the right or the left, depending upon whether the contacts 125 or 126 of relays R7 and R8, respectively, are closed. This depends upon the position of the cutting head to the right or the left side of the machine and the position of the contacts of the limit switches 139 and 142 resulting therefrom. When the left limit switch is open due to the cutting head being at the left side of the machine, the coil of the relay R7 is de-energized and the contacts 125 will be opened. The contacts of the limit switch 142 will be closed, completing a circuit through the coil of the relay R8 which will produce the closing of the relay contacts 126, thereby operating the motor to drive the cutting head to the right side of the machine. When the cutting head reaches the right side of the machine, the contacts of the limit switch 142 are opened, thereby de-energizing the coil of the relay R8, opening the contacts 126 and closing contacts 138 of the circuit 137. The contacts of the limit switch 139 are closed completing a circuit through the coil of the relay R7 which closes the contacts 125 of the circuit 123. As the cutting head moves from the left-hand side of the machine, the contacts 144 are open, interrupting the flow of current in the circuit 143 and the coil of the relay R9.

When the cutting head reaches the right-hand side of the machine, the contacts 145 are closed, completing a circuit through the coil to the relay R9 which opens a circuit through the contacts 133 for a short interval, sufficient to energize the coil 134 of the relay R4, thereby interrupting the flow of current in the circuit 132, producing the opening of the contacts 129 in the circuit 128, and opening the contacts 124 in the circuit 123 which de-energizes the motor 101 and interrupts its operation. When the cutting head is at the right-hand side of the machine, the contacts of the limit switch 142 are open, while the contacts of the limit switch 139 are closed, thereby energizing the coil of the relay R7, opening contacts 141 of the circuit 140 and closing the contacts 125 of the relay R7, thereby reversing the flow of the current in the field of motor 101 for reversing the motor after each operation.

The de-energization of the coil 134 of the relay R4 permits the contacts 119 in the pilot circuit 117 to close, thereby completing a circuit through the coil of the relay R1, which closes contacts 115 for producing the driving of the motor 19. The motor will operate until a predetermined amount of fabric is fed by the rolls, after which the motor 101 will be operated in the opposite direction from its direction of operation in the preceding cycle so as to travel to the opposite side of the machine for cutting off a length of fabric from the roll. As the cutting head reaches the end of its limit of travel, it will actuate the cam 109 of the rod 108 to raise the hold-down bar 60, and upon movement from the opposite side of the machine the cam will be released, permitting the hold-down bar to again grip the fabric against the race 49. The machine will continue to operate in this manner by feeding lengths of fabric through the rolls and cutting the fabric by moving the cutting head to one or the other side of the machine until the pilot switch 118 is open or the main switch 146 is thrown to "off" position to interrupt the flow of current to the circuits 112 and 113.

After a roll of fabric has been mounted in the machine and the control mechanism for the drum 110 adjusted to properly control the length of fabric to be severed, the machine will continue to operate until all of the fabric of the roll has been fed through the machine. A switch 148 may be disposed under the fabric between the roll 10 and the tensioning tubes 42 for the purpose of automatically interrupting the operation of the machine when all of the fabric has passed therethrough and tension is no longer present for maintaining the switch 148 in closed position. The switch 148 may be connected in series with the pilot circuit 117 which is interrupted when the switch is opened.

While a contact drum 110 is disclosed in the drawing for controlling the length of cloth fed by the rolls, it is to be understood that this is shown by way of illustration only and is not to be considered limiting the invention to the use of the drum. An electric eye or similar control device known in the art to be suitable could be substituted for the drum 110 for measuring the fabric fed each operation by the rolls. Certain fabrics may not be accurately fed by the rolls especially when tension is applied to the fabric to eliminite the wrinkles before the fabric passes through the rolls. An electric eye will be actuated by the fed fabric to accurately gauge the length fed irrespective of the amount of slippage which may occur in the feed rolls. The electric eye will operate a relay in the circuit in the same manner as the contact drum 110, as is well known to anyone skilled in the art. The invention is therefore not limited to the particular structure herein illustrated and described but any structures or devices known in the art to be capable of substitution therefor are to be considered as included in the inventive concept.

What is claimed is:

1. In a machine for severing strips from a length of material which includes in combination, a pair of feed rolls for gripping and feeding the material, means for measuring a length of material to be severed as it is fed by the rolls, a fixed race over which the material is fed, a carriage movable from one to the other side of the machine, a cutting wheel on said carriage having a cutting edge urged into engagement with the fabric and race, means for clamping the fabric located between the race and the feed rolls, and means for operating said clamping means actuated by the carriage when at the end of its travel at each side of the machine for releasing said clamping means.

2. In a machine for severing strips from a length of material which includes in combination, a pair of feed rolls for gripping and feeding the material, means for measuring a length of material to be severed as it is fed by the rolls, a fixed race over which the material is fed, a carriage movable from one to the other side of the machine, a cutting wheel on said carriage having a cutting edge, means for biasing said cutting edge into engagement with the fabric and race, means for clamping the fabric located between the race and the feed rolls, means for releasing said clamping means actuated by the carriage when at the end of its travel at each side of the machine, and means interconnecting the cutting wheel and clamping means for raising the wheel when the clamping means is raised.

3. In a machine for severing strips from a length of material which includes in combination, a pair of feed rolls for gripping and feeding the material, means for measuring a length of material to be severed as it is fed by the rolls, a fixed race over which the material is fed, a carriage movable from one to the other side of the machine, a cutting wheel on said carriage having a cutting edge in engagement with the fabric and race, means for clamping the fabric located between the race and the feed rolls, means for tensioning the fabric before entering the rolls, means for releasing said clamping means actuated by the carriage when at the end of its travel at each side of the machine, and means interconnecting the cutting wheel and clamping means for raising the wheel when the clamping means is raised.

4. In a machine for cutting strips from a length of fabric, which includes a bed having spaced standards thereon between which the fabric is fed, a pair of rolls mounted on said standards which are urged toward each other under a predetermined pressure, means for separating said rolls for initially feeding the fabric therethrough, means for driving said rolls, means for indicating the length of the fabric fed by the rolls, a hardened race extending parallel to the rolls, a hold-down bar between the race and the rolls for clamping the fabric after being fed, a cutting wheel, a cutting head supporting said wheel, means for mounting said head for movement between the standards along the race for severing the strip of fabric from the main length thereof, and means for raising the hold-down bar directly actuated by the cutting head at the end of its travel.

5. In a machine for cutting strips from a length of fabric, which includes a bed having spaced standards thereon between which the fabric is fed, a pair of rolls mounted on said standards which are urged toward each other under a predetermined pressure, means for separating said rolls for initially feeding the fabric therethrough, means for driving said rolls, means for indicating the length of the fabric fed by the rolls, a hardened race extending parallel to the rolls, a hold-down bar between the race and the rolls for clamping the fabric after being fed, a cutting wheel, a cutting head supporting said wheel, means for mounting said head for movement between the standards along the race for severing the strip of fabric from the main length thereof, means for raising the hold-down bar directly actuated by the cutting head at the end of its travel, and means interconnecting the cutting wheel and hold-down bar for raising the wheel when the hold-down bar is raised.

6. In a machine for cutting strips from a length of fabric, a table over which said fabric is fed, a support above said table, a carriage on said support, a cutting element on said head, a motor carried by said head having driving connection with said support by which said head is moved thereon from one to the other side of said table for cutting said fabric, and means on said head for raising the cutting element as the head reaches the end of its travel at one or the other side of said table.

EDWARD M. KNABUSCH.
EDWIN J. SHOEMAKER.

REFERENCES CITED

The following references are of record in the file of this patent:

UNITED STATES PATENTS

| Number | Name | Date |
|--------|------|------|
| 794,060 | Uzel | July 4, 1905 |
| 846,259 | Swan et al. | Mar. 5, 1907 |
| 878,527 | Heil | Feb. 11, 1908 |

(Other references on following page)

UNITED STATES PATENTS

| Number | Name | Date |
|---|---|---|
| 931,996 | Colpitts | Aug. 24, 1909 |
| 933,688 | Atwood | Sept. 7, 1909 |
| 942,164 | Bolton | Dec. 7, 1909 |
| 1,079,542 | Colpitts | Nov. 25, 1913 |
| 1,238,798 | Mansfield | Sept. 4, 1917 |
| 1,513,688 | Barrett | Oct. 28, 1924 |
| 1,524,707 | Golden | Feb. 3, 1925 |
| 1,728,163 | Maas | Sept. 10, 1929 |
| 1,732,148 | Barrett | Oct. 15, 1929 |
| 1,739,681 | Lautenschlager | Dec. 17, 1929 |
| 1,819,991 | Stevens | Aug. 18, 1931 |
| 1,874,750 | Heston | Aug. 30, 1932 |
| 1,897,534 | Simpson | Feb. 14, 1933 |
| 1,920,591 | Pesci | Aug. 1, 1933 |
| 2,071,097 | Wennberg | Feb. 16, 1937 |
| 2,261,837 | Allen | Nov. 4, 1941 |
| 2,310,838 | Helprin | Feb. 9, 1943 |

FOREIGN PATENTS

| Number | Country | Date |
|---|---|---|
| 441,648 | Great Britain | Jan. 23, 1936 |